United States Patent
Iverson

(10) Patent No.: US 10,192,544 B2
(45) Date of Patent: *Jan. 29, 2019

(54) METHOD AND SYSTEM FOR CONSTRUCTING A LANGUAGE MODEL

(71) Applicant: Yactraq Online Inc., Surrey (CA)

(72) Inventor: Lee Allan Iverson, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/487,189

(22) Filed: Apr. 13, 2017

(65) Prior Publication Data

US 2017/0221476 A1 Aug. 3, 2017

Related U.S. Application Data

(63) Continuation of application No. 13/732,445, filed on Jan. 2, 2013, now Pat. No. 9,652,452.

(60) Provisional application No. 61/583,677, filed on Jan. 6, 2012.

(51) Int. Cl.

| | |
|---|---|
| G10L 15/06 | (2013.01) |
| G06F 17/28 | (2006.01) |
| G06F 17/27 | (2006.01) |
| G10L 15/19 | (2013.01) |
| G10L 15/18 | (2013.01) |
| G10L 15/26 | (2006.01) |
| G10L 15/08 | (2006.01) |

(52) U.S. Cl.
CPC ............ G10L 15/063 (2013.01); G06F 17/27 (2013.01); G06F 17/28 (2013.01); G10L 15/1815 (2013.01); G10L 15/19 (2013.01); G10L 15/265 (2013.01); G10L 2015/0633 (2013.01); G10L 2015/088 (2013.01)

(58) Field of Classification Search
None
See application file for complete search history.

(56) References Cited

U.S. PATENT DOCUMENTS

| | | | |
|---|---|---|---|
| 7,983,902 B2 | 7/2011 | Wu et al. | |
| 8,433,576 B2 * | 4/2013 | Li | ............ G06F 17/271 704/251 |
| 8,543,401 B2 * | 9/2013 | Suendermann | ....... G10L 15/063 382/224 |
| 8,606,575 B1 | 12/2013 | Witt-Ehsani | |
| 2001/0029455 A1 | 10/2001 | Chin et al. | |
| 2003/0200094 A1 | 10/2003 | Gupta et al. | |
| 2004/0006478 A1 | 1/2004 | Alpdemir et al. | |
| 2004/0059736 A1 | 3/2004 | Willse et al. | |

(Continued)

*Primary Examiner* — Neeraj Sharma
(74) *Attorney, Agent, or Firm* — Joseph P. Kincart; Rogers Towers, P.A.

(57) ABSTRACT

Disclosed herein are various embodiments of methods and systems for constructing a first language model for use by a first Language Processing (LP) application of a plurality of LP applications. Each LP application of the plurality of LP applications receives one or more of a language based input, a derivative of the language based input, a response to the language based input and a derivative of the response. The method includes processing at least one input by a second LP application of the plurality of LP applications. Based on the processing of the second LP application, at least one output is generated. Subsequently, at least a portion of the first language model is constructed based on the at least one output.

10 Claims, 8 Drawing Sheets

(56) References Cited

U.S. PATENT DOCUMENTS

| | | | |
|---|---|---|---|
| 2004/0148170 A1* | 7/2004 | Acero | G06F 17/2715 |
| | | | 704/257 |
| 2007/0219776 A1 | 9/2007 | Gamon et al. | |
| 2007/0233488 A1 | 10/2007 | Carus et al. | |
| 2007/0271086 A1 | 11/2007 | Peters et al. | |
| 2008/0071533 A1* | 3/2008 | Cave | G10L 15/197 |
| | | | 704/235 |
| 2009/0030894 A1 | 1/2009 | Mamou et al. | |
| 2009/0216740 A1 | 8/2009 | Ramakrishnan et al. | |
| 2009/0326923 A1* | 12/2009 | Yan | G06F 17/278 |
| | | | 704/9 |
| 2010/0042410 A1 | 2/2010 | Stephens, Jr. | |
| 2010/0179801 A1 | 7/2010 | Huynh et al. | |
| 2011/0004462 A1 | 1/2011 | Houghton et al. | |
| 2012/0035915 A1* | 2/2012 | Kitade | G10L 15/197 |
| | | | 704/9 |
| 2012/0130709 A1* | 5/2012 | Bocchieri | G10L 15/063 |
| | | | 704/201 |
| 2012/0253799 A1 | 10/2012 | Bangalore et al. | |
| 2013/0006954 A1* | 1/2013 | Nikoulina | G06F 17/2818 |
| | | | 707/706 |
| 2013/0080167 A1 | 3/2013 | Mozer | |
| 2013/0138428 A1* | 5/2013 | Chandramouli | G06F 17/274 |
| | | | 704/9 |
| 2013/0159847 A1 | 6/2013 | Banke et al. | |

\* cited by examiner

METHOD AND SYSTEM FOR CONSTRUCTING A LANGUAGE MODEL

CROSS REFERENCE

This utility application claims the benefit of U.S. Non-Provisional patent application Ser. No. 13/732,445 filed Jan. 2, 2013 and entitled METHOD AND SYSTEM FOR CONSTRUCTING A LANGUAGE MODEL, which in turn claims priority to U.S. Provisional Application Ser. No. 61/583,677, filed Jan. 6, 2012, having the title "METHOD AND SYSTEM FOR PROCESSING A NATURAL LANGUAGE BASED INPUT", the entire contents of each of which are incorporated herein by this reference.

FIELD OF THE INVENTION

The present invention generally relates to language processing, and more specifically, to method and system for constructing a language model for use by a language processing application.

BACKGROUND OF THE INVENTION

Language processing is extensively used in several applications such as, for example, speech recognition, handwriting recognition, language translation etc. Language processing involves processing of a language based input, such as, for example, a natural language based input. The language based input may be any information represented in a language. Several language processing applications use a language model in order to process language based inputs more reliably. Further, the performance of such language processing applications depends to a large extent on the language model used.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the methods and systems disclosed.

DETAILED DESCRIPTION

Figure 1:
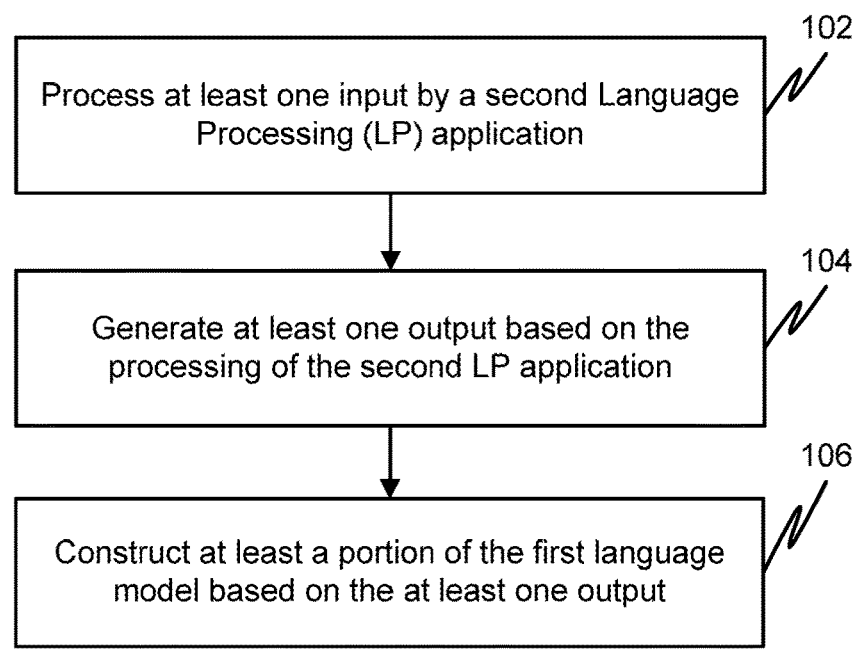
FIG. 1 illustrates a flow diagram of a method of constructing a first natural language model for use by a first Language Processing (LP) application in accordance with an embodiment.

As required, embodiments of the disclosed methods and systems are disclosed herein; however, it is to be understood that the disclosed embodiments are merely exemplary of the disclosed methods and systems, which can be embodied in various forms. Therefore, specific functional details disclosed herein are not to be interpreted as limiting, but merely as a representative basis for teaching one skilled in the art to variously employ the disclosed methods and systems in virtually any appropriately detailed structure. Further, the terms and phrases used herein are not intended to be limiting but rather to provide an understandable description of the methods and systems disclosed.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Before describing in detail embodiments that are in accordance with the disclosed methods and systems, it should be observed that the embodiments reside primarily in combinations of method steps and apparatus components related to method and system for automatically generating applications. Accordingly, the apparatus components and method steps have been represented where appropriate by conventional symbols in the drawings, showing only those specific details that are pertinent to understanding the embodiments of the disclosed methods and systems so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Disclosed herein are various embodiments of methods, systems and computer readable media for constructing a first language model for use by a first Language Processing (LP) application of a plurality of LP applications. Each LP application of the plurality of LP applications receives one or more of a language based input, a derivative of the language based input, a response to the language based input and a derivative of the response. The derivative of the language based input is a result of transforming at least a part of the language based input. The response to the language based input is another language based input generated by a second user who is different from a first user generating the language based input. The derivative of the response to the language based input is a result of transforming at least a part of the response to the language based input. In order to construct the first language model, at least one input is processed by a second LP application of the plurality of LP applications. In a non-limiting embodiment, the at least one input includes a language based corpus. Based on the processing, at least one output is generated. In a non-limiting embodiment, the at least one output includes at least a portion of a second language model. Subsequently, at least a portion of the first language model is constructed based on the at least one output. In a non-limiting embodiment, the portion of the first language model is based on at least one portion of the language based corpus.

FIG. 1 illustrates a flow diagram of a method of constructing a first language model for use by a first Language Processing (LP) application of a plurality of LP applications. Each LP application of the plurality of LP applications receives one or more of a language based input, a derivative of the language based input, a response to the language based input and a derivative of the response.

The plurality of LP applications may include one or more of, but are not limited to, a speech recognizer, speaker identifier, handwriting recognizer, optical character recognizer, language translator, grammar corrector, spelling corrector, topic identifier, text classifier, text summarizer, automatic question answering, named entity recognizer, speech synthesizer, natural language generator, part of speech tagger, natural language parser, information retriever, sentiment analyzer, pattern recognizer, image recognizer, motion recognizer and gesture recognizer.

In general, each LP application of the plurality of LP applications is an entity capable of processing a corresponding language based input. Further, each LP application of the plurality of LP applications may be implemented in one or more of, but not limited to, software, hardware, firmware and a combination thereof. In an embodiment, the plurality of LP applications may be stored on any computer readable media including but not limited to, RAM, ROM, PROM, EEPROM, flash memory, hard disk, CD-ROM, DVD or other optical disk storage, magnetic cassettes, magnetic tapes, and the like.

The language based input, in general, may be any representation of information in accordance with a language. For example, the language may be one or more of a natural language, a pictographic language, a glyphic language, a sign language, a tactile language, an olfactory language, a color based language, a temperature based language, a programming language, a musical language and an artificial language. The natural language may be, for example, English, French, German and so on. The sign language may be, for example, American Sign Language (ASL), British Sign Language (BSL), and so on. The pictographic language may be, for example, Chinese, Japanese, Korean and so on. The tactile language may be, for example, Braille. The programming language may be, for example, machine level language such as assembly language, high level languages such as C, C++, Java, Python, and so on. The musical language may be, for example, Solresol, Saurus, and so on. The artificial language may be, for example, Esperanto, Interlingua, and so on. In general, the language is characterized by a set of predetermined rules that govern how information is to be represented using primitives of the language. For example, primitives of the English language include words and phrases and the English grammar governs how information is to be represented using these primitives. In an embodiment, the language based input is a natural language based input and the LP application is a Natural Language Processing (NLP) application as explained further in conjunction with FIG. 2.

The derivative of the language based input is a result of transforming at least a part of the language based input. In an embodiment, the derivative of the language based input may be a result of a processing of at least a part of the language based input, wherein the processing is performed by a LP application of the plurality of LP applications. For example, a text obtained by character recognition of a handwritten input is a derivative of the handwritten input. As another example, a text obtained by gesture recognition of a gesture based input is a derivate of the gesture based input. The response to the language based input is another language based input generated by a second user who is different from a first user generating the language based input. For example, the language based input may be a question asked by the first user conversing with the second user. In response to the question, the second user may provide an answer which forms a second language based input. In this case, the second language based input is the response to the language based input. The derivative of the response to the language based input is a result of transforming at least a part of the response to the language based input. In an instance, the derivative of the response to the language based input may be a result of a processing of at least a part of the response to the language based input, wherein the processing is performed by a LP application of the plurality of LP applications. For example, if the language based input is a question asked by a first user communicating with a second user, a text obtained by automatic handwriting recognition of an answer provided by the second user would form a derivative of the response to the language based input.

The first language model encapsulates one or more linguistic characteristics of a language corresponding to an input to the first LP application. In another embodiment, the first language model may encapsulate one or more linguistic characteristics of a language corresponding to one or more of the language based input, a derivative of the language based input, a response to the language based input and a derivative of the response. The one or more linguistic characteristics may include one or more of, but are not limited to, a set of valid primitives of the language, lexical characteristics, syntactic characteristics, semantic characteristics, probabilities of occurrence corresponding to one or more primitives, probabilities of occurrence of two or more primitives within one or more spatiotemporal proximities, probabilities of occurrence of one or more primitives in relation to a context, one or more primitives in an external corpus that categorizes a language model, and any combination thereof. The context may be characterized in general by one or more factors related to an environment where an information represented using the language is instantiated and/or categorized. The instantiation of the information may correspond to one or more of generation of the information, transmission of the information, storage of the information and consumption of the information. For example, the context may be one or more of, but not limited to, name of a section of a document where the information is instantiated, a time at which the information is instantiated, a place where the information is instantiated and a profile of a user instantiating the information. The profile of the user may include, for example, one or more of a name, an age, gender, interests, an occupation, an income level, an address, educational background, nationality, ethnic origin, culture, a customer behavior, a purchasing characteristic, a personality trait and a combination thereof. The primitives of the language, in general, are tokens that form the basis for expressing information using the language. Some non limiting instances of primitives of the language include characters, words, syllables, phrases, symbols, pictograms, gestures, sounds, colors, temperatures and smells.

Examples of the first language model include one or more of, but are not limited to, a uniform language model, a finite state machine language model, a statistical language model, a rule based language model, a context-free grammar, a phrase-structure grammar, a non-probabilistic language model and a stochastic language model. The use of the first language model by the first LP application may result in improved processing of the language based input to the first LP application. For instance, there may be ambiguities in recognizing a handwritten note by the first LP application because of variations in strokes, pressure and style of writing. However, use of a language model by the first LP application for processing the handwritten note may generate more accurate transcriptions.

As illustrated in FIG. 1, at step 102, at least one input is processed by a second LP application of the plurality of LP applications. The at least one input is a language based input. The processing of the at least one input may include one or more of, but are not limited to, parsing the at least one input, analyzing the at least one input, identifying one or more characteristics corresponding to the at least one input, identifying one or more linguistic characteristics of a language corresponding to the at least one input, transforming the at least one input from one form to another form, filtering the at least one input and aggregating the at least one input.

In an embodiment, the at least one input includes one or more of a language based corpus and a language model corresponding to at least a portion of the language based corpus. For example, the language based corpus may be a collection of image documents embodying information represented in sign language. Some examples of transforming the at least one input include, but are not limited to, speech recognition, speaker identification, handwriting recognition, Optical Character Recognition (OCR), language translation, grammar correction, spelling correction, topic identification, text classification, text summarization, automatic question answering, named entity recognition, speech synthesis, natural language generation, part of speech tagging, natural language parsing, information retrieval, language training, language translation, language transliteration, sentiment analysis and gesture recognition.

In an embodiment, the processing of the at least one input may include training the second LP application based on one or more of, but not limited to, the language based corpus and a language model corresponding to at least a portion of the language based corpus. The language based corpus may include one or more category identifiers corresponding to different portions of the language based corpus. For example, each document of the language based corpus may include a category identifier corresponding to the category to which a document belongs. The one or more category identifiers may be assigned by one or more of a human and a machine. The language based corpus may be gathered from one or more databases including but not limited to the World Wide Web (WWW), content management systems, digital libraries, digital archives, and FTP servers. Alternatively, the language based corpus may be created by aggregating an input to a LP application of the plurality of LP applications.

In an embodiment, one or more of the language based corpus and a language model corresponding to at least a portion of the language based corpus are specific to a topic. The topic may be for example, sports, politics, movies, clothes and so on. In order to create the language based corpus specific to the topic, one or more topic specific queries corresponding to the topic is generated. The one or more topic specific queries generated may be one or more of semantic search queries and syntactic search queries. In one embodiment, one or more topic specific key-primitives, such as but not limited to keywords, are determined to generate the one or more topic specific queries. In an instance, the one or more topic specific key-primitives may be pre-determined and stored. The one or more key-primitives may be used as query terms along with query expansion. The query expansion may include one or more of, but not limited to, synonyms, meronyms, hypernyms, hyponyms, holynyms, toponyms, metronyms, metonyms, exonyms, acronyms and analogous forms thereof in other modalities. Subsequently, the one or more topic specific queries are executed over one or more databases. In an embodiment, the one or more topic specific queries are executed on one or more search engines through a browser and subsequently documents are retrieved corresponding to search results by parsing the search results page. In another embodiment, a direct communication with a search engine API may be established to execute the one or more topic specific queries. In one specific embodiment, a set of most relevant documents (e.g. 50 or 100 documents) corresponding to the topic are retrieved to improve upon accuracy. Consequently, one or more topic specific documents corresponding to the topic form the language based corpus specific to the topic. In an embodiment, a topic identifier is associated with language based corpus specific to the topic to differentiate documents belonging to different topics. The association between the topic identifier and a portion of the language based corpus specific to the topic may be performed by one or more of a human and a machine.

Subsequently, at step 104, at least one output is generated based on the processing of the at least one input. In an embodiment, the at least one output includes at least a portion of a second language model. The second language model encapsulates one or more linguistic characteristics of a language corresponding to the at least one input. The one or more linguistic characteristics may include one or more of, but are not limited to, a set of valid primitives of the language, lexical characteristics, syntactic characteristics, semantic characteristics, probabilities of occurrence corresponding to one or more primitives, probabilities of occurrence of two or more primitives within one or more spatiotemporal proximities and probabilities of occurrence of one or more primitives in relation to a context, one or more primitives in an external corpus that categorizes a language model, and any combination thereof. The context may be characterized in general by one or more factors related to an environment where an information represented using the language corresponding to the at least one input is instantiated and/or categorized. The instantiation of the information may correspond to one or more of generation of the information, transmission of the information, storage of the information and consumption of the information. For example, the context may be one or more of, but not limited to, name of a section of a document where the information is instantiated, a time at which the information is instantiated, a place where the information is instantiated and a profile of a user instantiating the information. The profile of the user may include, for example, one or more of a name, an age, gender, interests, an occupation, an income level, an address, educational background, nationality, ethnic origin, culture, a customer behavior, a purchasing characteristic, a personality trait and a combination thereof. In a particular example, the one or more linguistic characteristics may be a set of keywords corresponding to a category identifier of the one or more category identifiers. Thus, in an instance, as a result of processing the at least one input and generating the at least one output, the second LP application learns associations between the one or more category identifiers and the one or more linguistic characteristics corresponding to the language based corpus.

Examples of the second language model include one or more of, but are not limited to, a uniform language model, a finite state machine language model, a statistical language model, a rule based language model, a context-free grammar, a phrase-structure grammar, a non-probabilistic language model and a stochastic language model.

In an embodiment, the portion of the second language model includes one or more key-primitives of a language. The language corresponds to one or more of the first language model and the second language model. For example, the one or more key-primitives may be keywords. In an embodiment, at least a part of the first language model is identical to at least a part of the second language model. In another embodiment, at least a part of the first language model is non-identical to at least a part of the second language model.

Subsequent to the generation of the at least one output, at least a portion of the first language model is constructed based on the at least one output at step 106. In an embodiment, the at least one output is used for identifying at least a portion of the language based corpus. Subsequently, the portion of the first language model is constructed based on the portion of the language based corpus. For example, the at least one output may include a set of key-primitives which are used to identify the portion of the language based corpus that includes at least one occurrence of a key-primitive of the set of key-primitives.

In another embodiment, the at least one output is used for identifying at least a portion of another language based corpus which is substantially similar to at least a part of the language based corpus. For example, the language based corpus may include a set of articles written by an author, while the another language based corpus may include articles written by the author which are not present in the set of articles. As another example, the language based corpus may include articles relating to a topic written by a set of authors, while the another language based corpus may include articles relating to the topic written by authors other than the set of authors. As yet another example, the language based corpus may include articles relating to a topic written in English, while the another language based corpus may include articles relating to the topic written in French. In this case, in order to identify the portion of the another language based corpus, the at least one output may be translated from English to French.

In an embodiment, the portion of the first language model may be constructed based on each of the at least one output and one or more precomputed language models. For instance, one or more modifications may be performed on the one or more precomputed language models based on the at least one output. The one or more modifications may be for example, but are not limited to, aggregation, deletion, addition, filtration, truncation and transformation. In another embodiment, the at least one portion of the first language model may be constructed based on each of the at least one output, a portion of the language based corpus and the one or more precomputed language models.

Subsequent to the construction of the first language model, in an embodiment, the first language model may be used by the first LP application in order to process a first language based input to the first LP application. Thereafter, in an embodiment, an output of the first LP application may be processed by the second LP application. As a result, an improved performance is attained in processing the first language based input utilizing at least each of the first LP application, the first language model and the second LP application. This is further explained in conjunction with FIG. 5.

In an embodiment, a purpose corresponding to a processing of a first language based input to the first LP application is determined. The purpose may be for example, but is not limited to, one or more of speech recognition, speaker identification, handwriting recognition, Optical Character Recognition (OCR), language translation, grammar correction, spelling correction, topic identification, text classification, text summarization, automatic question answering, named entity recognition, speech synthesis, natural language generation, part of speech tagging, natural language parsing, information retrieval, sentiment analysis and gesture recognition. Accordingly, based on the purpose, at least the portion of the first language model is identified. For example, a purpose corresponding to the processing of a text input may be text summarization wherein, a large volume of text input to the first LP application may be summarized into a concise paragraph by the first LP application. Accordingly, a language model specific to text summarization may be indentified for use by the first LP application.

In another embodiment, a context corresponding to a language based input to the first LP application is determined. The context may be, for example, but is not limited to, one or more of, but is not limited to, subject, topic, time, place, profile of a user instantiating the language based input and location of the user. Subsequently, the first language model may be selected based on the context. For example, a location of a user instantiating a language based input to the first LP application may be determined. Thereafter, a language model specific to the determined location may be selected for use by the first LP application to process subsequent language based inputs from the user.

In an embodiment, processing of each of a first language based input to the first LP application and a second language based input to the second LP application may result in a determination of a topic corresponding to the first language based input. In this case, the second language based input includes an output of the first LP application. Subsequently, one or more advertisements relevant to the topic may be retrieved and presented. In an instance, the advertisement may be presented to one or more of a user instantiating the first language based input and one or more other users in conversation with the user. In another instance, the advertisement may be presented to any user who consumes the first language based input, which may be, for example, a radio broadcast.

In an embodiment, a first language corresponding to a first language based input received by the first LP application is substantially similar to a second language corresponding to a second language based input received by the second LP application. Consider an example in which each of a first user and a second user are conversing in English. Further, assume that the second LP application is a second topic classifier situated at a client device of a second user and the first LP application is a first speech recognizer situated at a client device of the first user. Additionally, assume that a second speech recognizer is disposed at the client device of a second user and a first speech recognizer is disposed at the client device of the first user. The second topic classifier is trained based on an English language text corpus. Based on the training, one or more topic specific English keywords are identified corresponding to a topic. The one or more topic specific English keywords are then be used to filter the English language text corpus to create a refined English language text corpus. Based on the refined English language text corpus, a topic specific language model is constructed for use by the first speech recognizer situated at a client device of the first user.

In another embodiment, a first language corresponding to a first language based input received by the first LP application is substantially dissimilar to a second language corresponding to a second language based input received by the second LP application. Consider an example in which each of a first user and a second user are conversing in English. Further, assume that the second LP application is a second topic classifier situated at a client device of a second user and the first LP application is a first speech recognizer situated at a client device of the first user. Additionally assume that a second speech recognizer is disposed at the client device of a second user and a first speech recognizer is disposed at the client device of the first user. The second topic classifier is trained based on an English language text corpus. Based on the training, one or more topic specific English keywords are identified corresponding to a topic. The one or more topic specific English keywords are then translated to generate one or more French keywords. The one or more French keywords are then used to filter a French language text corpus to create a refined French language text corpus. Based on the refined French language text corpus, a language model is constructed for use by the first speech recognizer situated at a client device of the first user. Additionally, in this case, since each of the first user and second user are conversing in English, an English to French translator is disposed at the client device of the first user. Accordingly, a language based input received by the first speech recognizer is in French, while a language based input received by the second topic classifier is in English.

Figure 2:
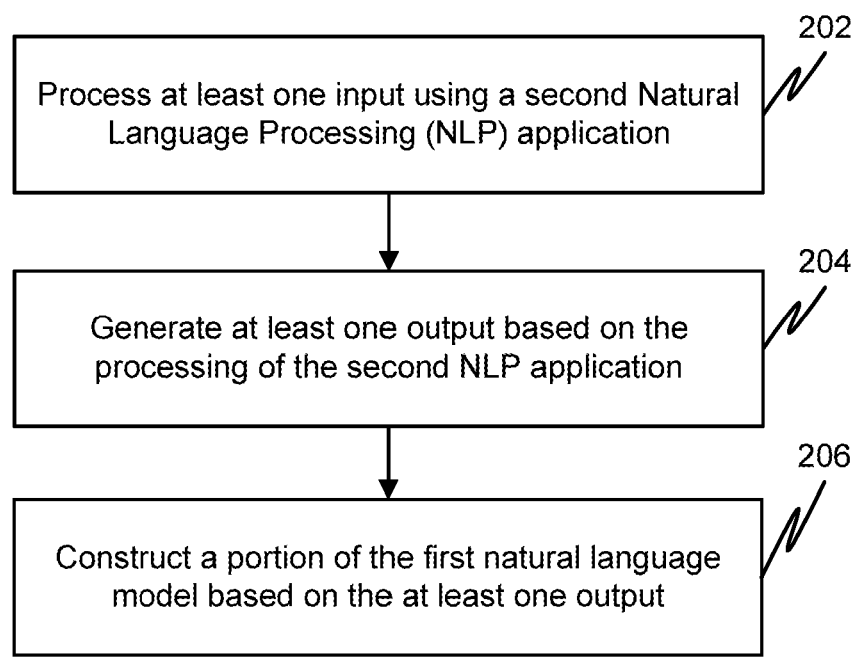
FIG. 2 illustrates a flow diagram of a method of constructing the first natural language model for use by the first Natural Language Processing (NLP) application in accordance with another embodiment.

FIG. 2 is a flow diagram of a method of constructing a first natural language model for use by a first Natural Language Processing (NLP) application of a plurality of NLP applications. Each NLP application of the plurality of NLP applications receives one or more of a natural language based input and a derivative of the natural language based input. The first natural language model is an instance of the first language model, the first NLP application is an instance of the first LP application, the plurality of NLP applications is an instance of the plurality of LP applications and the natural language based input is instance of the language based input. These are explained in greater detail in conjunction with FIG. 1. At step 202, at least one input is processed by a second NLP application of the plurality of NLP applications. Thereafter, at step 204, at least one output is generated based on the processing of the second NLP application. Subsequently, at least a portion of the first natural language model is constructed based on the at least one output at step 206. Details regarding each of step 202, step 204 and step 206 are explained in conjunction with FIG. 1.

Figure 3:
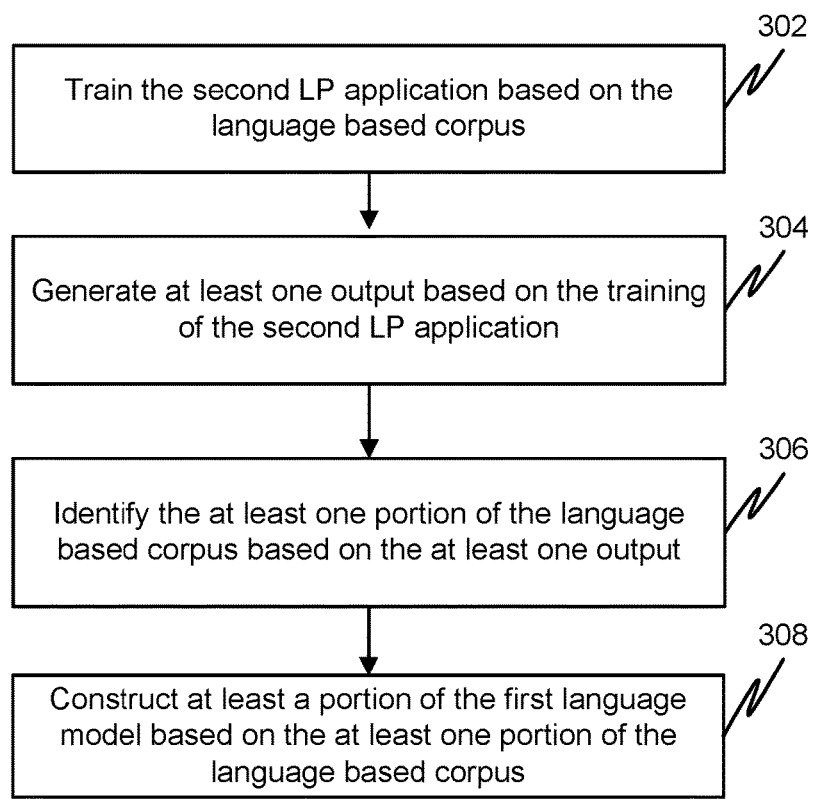
FIG. 3 illustrates a flow diagram of a method of processing a natural language based input using the plurality of LP Language Processing (LP) applications in accordance with an embodiment.

FIG. 3 is a flow diagram of a method constructing the first language model in accordance with another embodiment. At step 302, the second LP application is trained based on the language based corpus. The language based corpus may include one or more category identifiers corresponding to different portions of the language based corpus. For example, each document of the language based corpus may include a category identifier corresponding to the category to which the document belongs. As a result of the training, the second LP application learns an association between a category identifier and the one or more linguistic characteristics corresponding to the category identifier.

Thereafter, at step 304, the at least one output is generated based on the training. In step 306, the at least one portion of the language based corpus is identified based on the at least one output. Subsequently, at step 308, the at least one portion of the first language model is constructed based on the at least one portion of the language based corpus. The first language model may then be used by the first LP application for processing a language based input received by the first LP application. In an embodiment, the second LP application may receive at least an output of the first LP application. As a result, processing of an input received by the first LP application is improved by utilizing each of the first LP application, the first language model and the second LP application.

Figure 4:
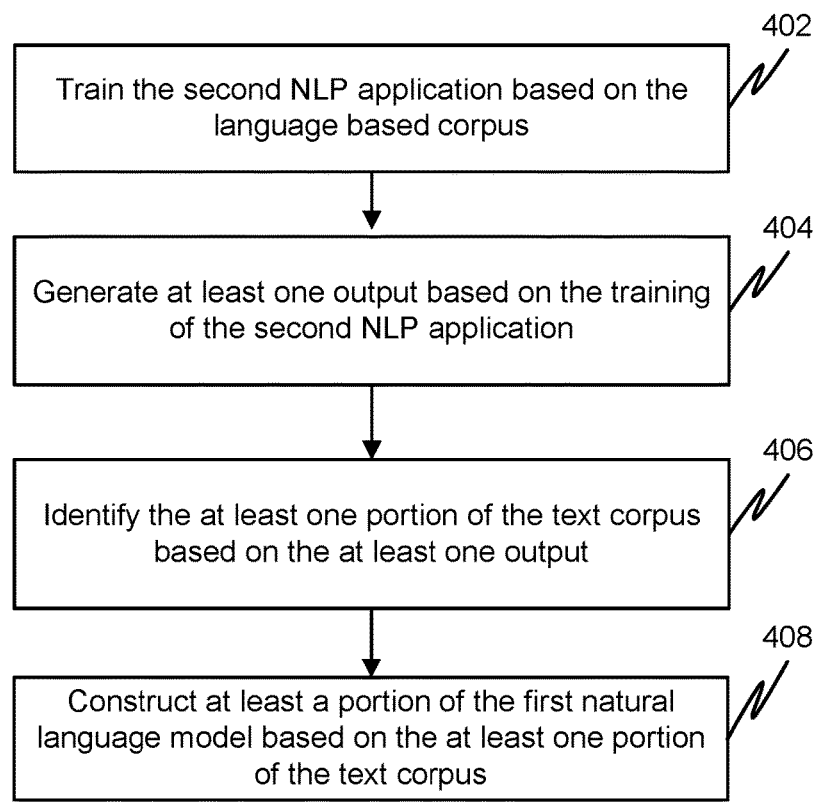
FIG. 4 is a flow diagram of a method constructing a first natural language model in accordance with another embodiment.

FIG. 4 is a flow diagram of a method constructing a first natural language model in accordance with another embodiment. At step 402, a second NLP application is trained based on a natural language based corpus. The second NLP application is an instance of the second LP application and the natural language based corpus is an instance of the language based corpus.

Thereafter, at step 404, the at least one output is generated based on the training. In step 406, at least one portion of the natural language based corpus is identified based on the at least one output. The at least one portion of the natural language based corpus is an instance of the at least one portion of the language based corpus. Subsequently, at step 408, at least one portion of the first natural language model is constructed based on the at least one portion of the natural language based corpus. The first natural language model may then be used by a first NLP application which is an instance of the first LP application. The first NLP application may process a language based input received by the first NLP application, wherein the processing is based on the first natural language model. In an embodiment, the second NLP application may receive at least an output of the first NLP application. As a result, processing of an input received by the first NLP application is improved by utilizing each of the first NLP application, the first natural language model and the second NLP application.

Figure 5:
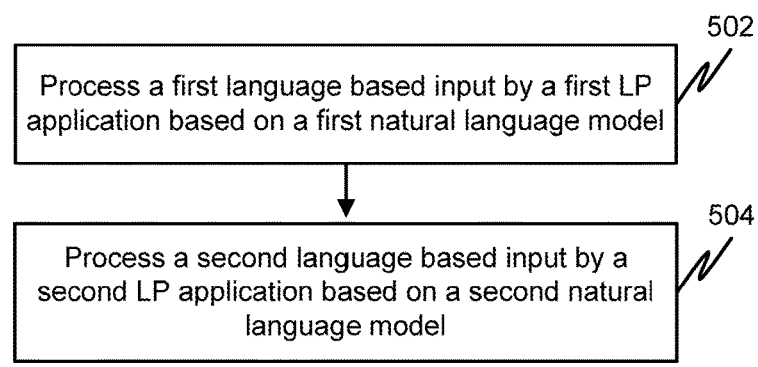
FIG. 5 is a flow diagram of a method of processing a natural language based input using the plurality of LP Language Processing (LP) applications.

FIG. 5 is a flow diagram of a method of processing a natural language based input using the plurality of LP Language Processing (LP) applications. At step 502, a first language based input is processed by the first LP application of the plurality of LP applications. The processing of the first language based input is based on the first language model. At step 504, a second language based input is processed by the second LP application of the plurality of LP applications. The processing of the second language based input is based on a second language model. The second language based input is one or more of substantially similar to the first language based input, a derivative of the first language based input, a response to the first language based input and a derivative of the response. Additionally, at least a portion of the first natural language model is constructed based on at least one output of a processing of the second LP application.

In an exemplary embodiment, at least one topic of a speech may be identified utilizing each of a topic classifier and a speech recognizer. The topic classifier is an instance of the second NLP application and the speech recognizer is an instance of the first NLP application. An output of the speech recognizer is fed as input to the topic classifier. Initially, the topic classifier is trained with at least one topic-specific text corpus. The at least one topic-specific text corpus is an instance of the at least one input to the second NLP application. Subsequently, a set of keywords corresponding to at least one topic are identified based on the training. The set of keywords is an instance of the at least one output of the second NLP application. Thereafter, at least one refined topic-specific text corpus is formed based on at least a portion of the topic-specific text corpus and the set of keywords. The at least one refined topic-specific text corpus is an instance of the portion of the natural language based corpus. Subsequently, at least one topic-specific language model is generated based on the at least one refined topic-specific text corpus. The at least one topic specific language model is an instance of the first natural language model. Thereafter, a speech input to the speech recognizer is converted into at least one text based on the at least one topic-specific language model. Based on the at least one text, the at least one topic is subsequently identified by the topic classifier. As a result of using the same topic-specific corpus for performing each of training the topic classifier and generation of topic-specific language model for the speech recognizer, and subsequently utilizing each of the speech recognizer and the topic classifier in conjunction to process the speech input, an improved performance may be attained.

Figure 6:
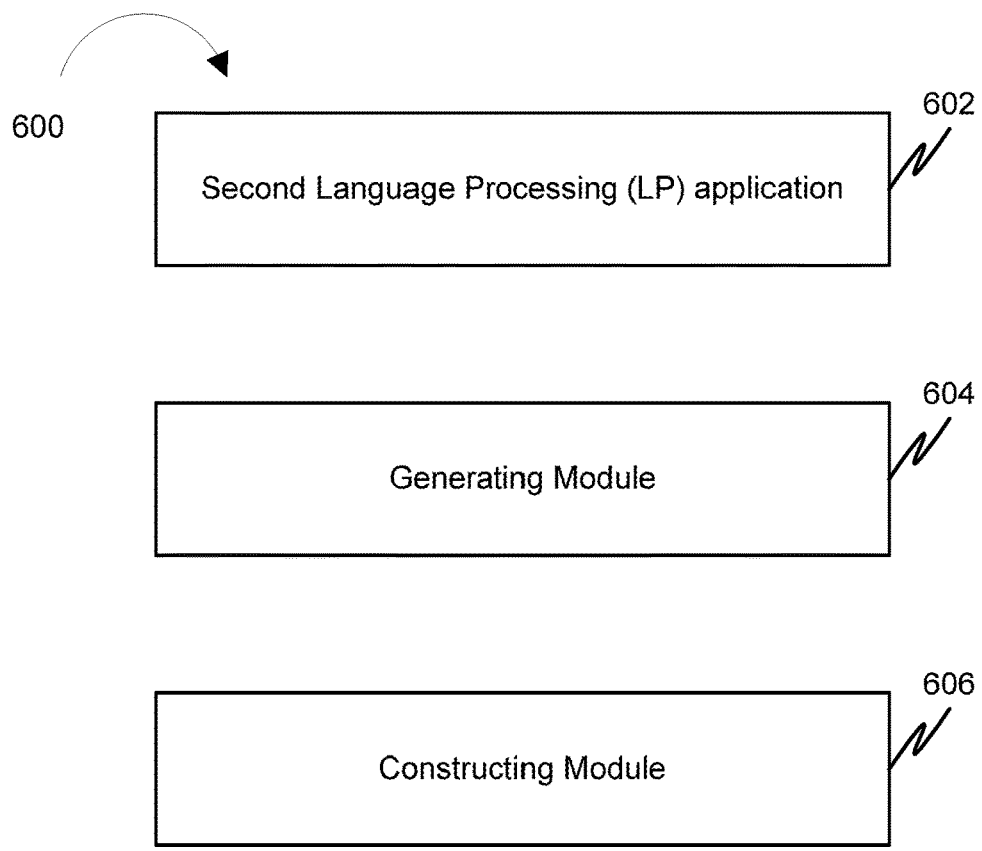
FIG. 6 illustrates a block diagram of a system for constructing the first language model in accordance with an embodiment.

FIG. 6 illustrates a block diagram of a system 600 for constructing the first language model in accordance with an embodiment. System 600 includes the second Language Processing (LP) application 602 configured to process the at least one input. The system further includes a generating module 604 configured to generate the at least one output based on the processing of the second LP application 602. In an embodiment, the generating module 604 may be a part of the second LP application 602. System 600 also includes a constructing module 606 configured to construct at least the portion of the first language model based on the at least one output generated by the generating module 604.

Figure 7:
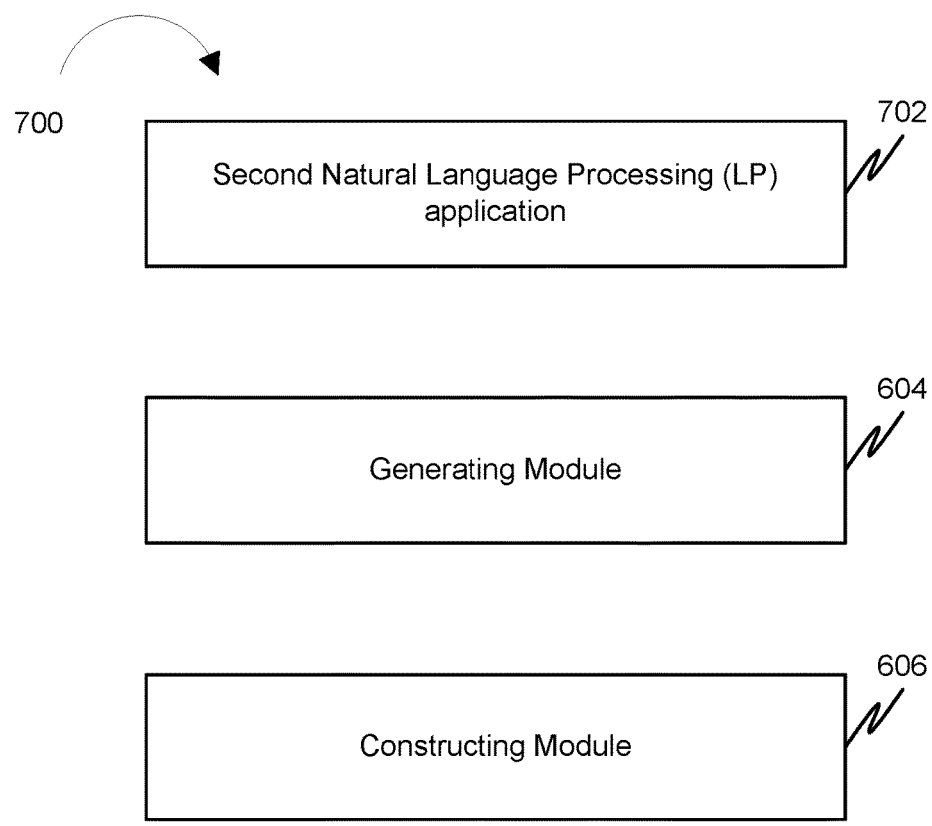
FIG. 7 illustrates a block diagram of a system for constructing the first natural language model in accordance with an embodiment.

FIG. 7 illustrates a block diagram of a system 700 for constructing the first natural language model in accordance with another embodiment. System 700 includes the second Natural Language Processing (NLP) application 702 configured to process the at least one input. System 700 further includes generating module 604 configured to generate the at least one output based on the processing of the second NLP application 702. System 700 also includes constructing module 606 configured to construct at least a portion of the first natural language model based on the at least one output generated by generating module 604.

Figure 8:
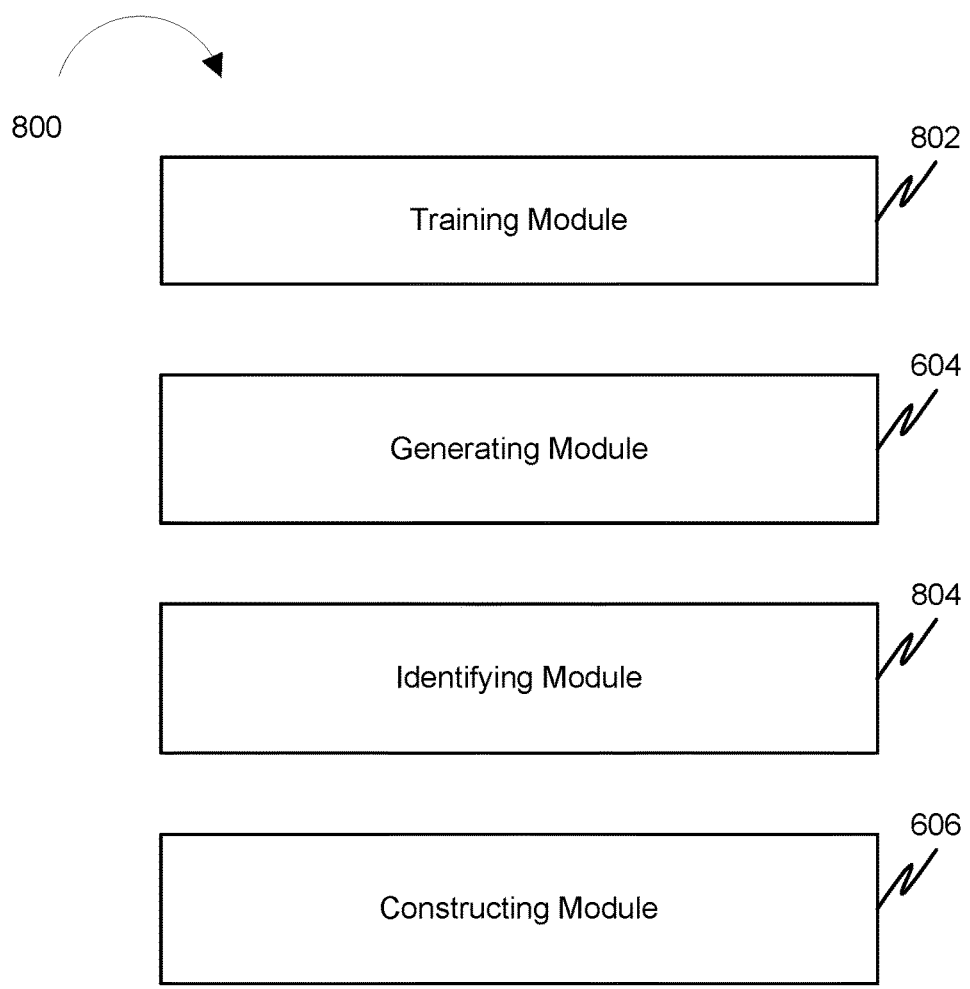
FIG. 8 illustrates a block diagram of a system for constructing the first language model in accordance with another embodiment.

FIG. 8 illustrates a block diagram of a system 800 for constructing the first language model in accordance with an embodiment. System 800 includes a training module 802 configured for training the second Language Processing (LP) application based on the language based corpus. System 800 further includes generating module 604 configured to generate the at least one output based on the training of the second LP application. System 800 also includes an identifying module 804 configured to identify the at least one portion of the language based corpus based on the at least one output. Additionally, system 800 includes constructing module 606 configured to construct at least a portion of the first language model based on the at least one portion of the language based corpus. In an embodiment, the second Language Processing (LP) application is the second Natural language Processing (NLP) application, the language based corpus is the natural language based corpus and the first language model is the first natural language model.

An example of an application of the disclosed methods and systems is for identifying one or more categories for advertising based on one or more topics as determined from an audio stream. The audio stream may include a user's conversation and may include one or more topics of the user's interests. The audio stream may originate from, but is not limited to, a videoconference, a telephone call and a radio program. The audio stream is fed into the first LP application which may be, for example, a speech recognizer, and the output of the first LP application may be fed to the second LP application, which may be for example a topic classifier. As a result, one or more topics corresponding to the audio stream may be identified by the topic classifier. Subsequently, one or more advertisements that correspond to the one or more topics are presented to the user. In one specific case, the one or more topics may be recognized after a fixed segment (e.g. 30 seconds) of the audio stream and advertisements corresponding to one or more topics recognized from a previous segment of the audio stream may be presented to the user. The advertisements presented to the user need not interrupt the user but may be presented passively for example, in the form of visual advertisements. If the audio stream is stored and replayed, then the one or more topics ma be recognized and once and stored in a time-dependent format and can be accessed and used depending on the timestamp within the audio stream that the user is currently listening to.

Another application of the methods and systems disclosed involves the monitoring of conversations including telephone calls, audio and video conferences inside a corporation or for an individual. In this case, the one or more topics are defined by one more of the corporation hosting the system and the individual using it. Further, the language based corpus may be taken from one or more of, but not limited to, the corporation content management system, the individual's stored documents, the individual's emails, the individual's scheduler and calendar, and the like. In this case the one or more topics identified could be used to automatically extract relevant documents, HR records or other content and displayed to the user during the conversation as an aide memoire or to ease access to relevant information to inform the conversation.

In the foregoing description, although the steps corresponding to various flow charts are described in a certain sequence, a person skilled in the art would appreciate that the steps may be performed in any other appropriate sequence without departing from the scope of the methods and systems disclosed herein.

It will be appreciated that embodiments of the methods and systems described herein may be comprised of one or more conventional transaction-clients and unique stored program instructions that control the one or more transaction-clients to implement, in conjunction with certain non-transaction-client circuits, some, most, or all of the functions of methods of constructing a first language model for use by a first Language Processing (LP) application of a plurality of LP applications, wherein each LP application of the plurality of LP applications receives one or more of a language based input, a derivative of the language based input, a response to the language based input and a derivative of the response as disclosed herein. The non-transaction-client circuits may include, but are not limited to, a radio receiver, a radio transmitter, signal drivers, clock circuits, power source circuits, and user input devices. As such, these functions may be interpreted as steps of methods for constructing a first language model for use by a first Language Processing (LP) application of a plurality of LP applications, wherein each LP application of the plurality of LP applications receives one or more of a language based input, a derivative of the language based input, a response to the language based input and a derivative of the response as disclosed herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will realize that the above-recognized advantages and other advantages described herein are merely exemplary and are not meant to be a complete rendering of all of the advantages of the various embodiments of the methods and systems disclosed.

In the foregoing specification, specific embodiments of the disclosed methods and systems have been described. However, one of ordinary skill in the art appreciates that various modifications and changes can be made without departing from the scope of the methods and systems disclosed. Accordingly, the specification and figures are to be regarded in an illustrative rather than a restrictive sense, and all such modifications are intended to be included within the scope of the methods and systems disclosed. The benefits, advantages, solutions to problems, and any element(s) that may cause any benefit, advantage, or solution to occur or become more pronounced are not to be construed as a critical, or required.

What is claimed is:

1. A method of constructing a natural language model for accessing a content management system, the method comprising:
   a) using a processor, constructing a first natural language model within a Natural Language Processing (NLP) application;
   b) receiving a first natural language input from a first user comprising a text in the first natural language into the NLP application;
   c) encapsulating linguistic characteristics within the first natural language model based upon the first natural language input, the linguistic characteristics comprising:
      i) a set of multiple primitives of the first Natural Language, said multiple primitives comprising tokens that form a basis for expressing information using the first Natural Language; and
      ii) semantic characteristics of the first Natural Language; and
      iii) syntactic characteristics of the first natural language; and
      iv) a probability of occurrence of two of said multiple primitives within a spatiotemporal proximity;
   d) generating a derivative of the first natural language input, said derivative of the first natural language input based upon the first natural language model and the linguistic characteristics;
   e) communicating with a search engine application program interface;
   f) retrieving documents relevant to the first natural language input by executing a search via the search engine with a topic specific query based upon the derivative and the linguistic characteristics;
   g) presenting the documents relevant to the first natural language input and identified via the search engine to the first user;
   h) receiving a second natural language input from a second user comprising a text in the second natural language input different from the first natural language input and inputting the second natural language input into a second natural language model in the NLP application, wherein the second natural language model is based upon the linguistic characteristics encapsulated within the first natural language model;
   i) generating, using the processor, at least one output based on processing of the second natural language input by the second natural language model in the NLP application, wherein the output comprises a text in the second natural language;
   j) presenting the output based on processing the second natural language model to the second user; and
   k) storing at least a portion of the first natural language model in a memory communicatively coupled to the processor.

2. The method of claim 1 further comprising training the NLP application based on a text corpus in at least one of the first natural language and the second natural language.

3. The method of claim 1 further comprising repeating, using the processor, steps a) through g) of claim 1 on a predetermined time interval of at least thirty seconds and presenting content to the first user based upon the repeated steps.

4. The method of claim 2, wherein the text corpus is specific to a topic.

5. The method of claim 1, wherein the NLP application comprises a speech recognition application and a topic classification application.

6. The method of claim 5, wherein at least one advertisement is presented to a user based on a topic identified by the topic classification application.

7. A computer implemented method of constructing a natural language model for processing a natural language input, the method comprising:
   a) using a processor, constructing a first natural language model within a Natural Language Processing (NLP) application;
   b) receiving a first natural language input in a first natural language from a first user into the NLP application;
   c) encapsulating linguistic characteristics within the first natural language model based upon the first natural language input, the linguistic characteristics comprising:

i) a set of multiple primitives of the first Natural Language, said multiple primitives comprising tokens that form a basis for expressing information using the first Natural Language; and ii) semantic characteristics of the first Natural Language; and iii) syntactic characteristics of the first natural language; and iv) a probability of occurrence of two of said multiple primitives within a spatiotemporal proximity;

d) generating a derivative of the first natural language input, said derivative of the first natural language input based upon the first natural language model and the linguistic characteristics;

e) communicating with a search engine application program interface;

f) retrieving documents relevant to the first natural language input by executing a search via the search engine with a topic specific query based upon the linguistic characteristics;

g) receiving a second natural language input from a second user, wherein the second natural language input is different from the first natural language and inputting the second natural language input into a second natural language model in the NLP application, wherein the second natural language model is based upon the linguistic characteristics encapsulated within the first natural language model;

h) generating, using the processor, at least one output based on processing of the second natural language input by the second natural language model in the NLP application, wherein the output comprises a text in a second natural language; and i) storing at least a portion of the first natural language model in a memory communicatively coupled to the processor.

8. The method of claim 7, wherein each of the first natural language input and the second natural language input comprise a speech input.

9. The method of claim 8, wherein the NLP application comprises a speech recognition application and a topic classification application.

10. The method of claim 9, wherein at least one advertisement is presented to a user based on a topic identified by the topic classification application.

* * * * *